United States Patent [19]

Tanaka

[11] E Re. 29,250

[45] Reissued June 7, 1977

[54] DIGITAL ELECTRONIC WATCH HAVING CALENDAR DISPLAY ARRANGEMENT

[75] Inventor: Kojiro Tanaka, Tokyo, Japan

[73] Assignee: Kabushiki Kaisha Suwa Seikosha, Tokyo, Japan

[22] Filed: Feb. 5, 1975

[21] Appl. No.: 547,308

Related U.S. Patent Documents

Reissue of:

[64] Patent No.: 3,738,099
Issued: June 12, 1973
Appl. No.: 260,685
Filed: June 7, 1972

[30] Foreign Application Priority Data

June 6, 1971 Japan ..... 46-40713

[52] U.S. Cl. ..... 58/58; 40/107; 58/4 A; 58/50 R; 340/324 M

[51] Int. Cl.² ..... G04B 19/24

[58] Field of Search ..... 340/324 M; 40/107; 350/160 LC; 58/23 R, 23 A, 4 R, 4 A, 58, 50 R

[56] References Cited

UNITED STATES PATENTS

| | | | |
|---|---|---|---|
| 3,276,198 | 10/1966 | Barbera | 58/4 A |
| 3,653,204 | 4/1972 | Miwa | 58/4 A |
| 3,672,155 | 6/1972 | Bergey et al. | 58/50 R |
| 3,691,755 | 9/1972 | Girard | 58/50 R |
| 3,701,249 | 10/1972 | Bergey et al. | 58/23 R X |
| 3,772,874 | 11/1973 | Lefkowitz | 58/4 A X |

*Primary Examiner*—Ulysses Weldon
*Attorney, Agent, or Firm*—Blum, Moscovitz, Friedman & Kaplan

[57] ABSTRACT

An electronic watch is provided with means for digitally displaying time and date and day of the week by means of liquid crystal display elements. The display provides an indication of the second, minute and hour as well as an indication of whether it is morning or afternoon. The calendar display includes a plurality of liquid crystal display elements arranged in matrix form having seven columns each representing a day of the week and five rows each representing the weeks of the month. A plate having the days and dates of the month to be displayed is mounted on said liquid crystal element matrix by suitable means.

19 Claims, 2 Drawing Figures

DIGITAL ELECTRONIC WATCH HAVING CALENDAR DISPLAY ARRANGEMENT

Matter enclosed in heavy brackets [ ] appears in the original patent but forms no part of this reissue specification; matter printed in italics indicates the additions made by reissue.

BACKGROUND OF THE INVENTION

This invention relates to digital electronic watches, and more particularly to digital electronic watches having liquid crystal display elements and the capability of displaying second, minute, hour, morning and afternoon indications, date and day of the week.

In the art, light emission diode elements have been employed as the display elements for digital electronic watches. One drawback of such use of light emission diode elements is that only the hour and minute can be displayed since a great amount of electric power is required to operate the light emission diodes and only a small-size power source can be included in the limited space of a compact, modern electronic watch. Further, such prior art watches are adapted to display time only upon demand of the user, as when the user presses a suitable actuation button, in order to limit power consumption.

Where it has been proposed to provide digital electronic watches incorporating liquid crystal elements, such watches have been limited to the display of hour and minute due to the poor voltage response characteristics of such elements. This has made it difficult to provide digital electronic watches incorporating displays of the second and calendar information.

SUMMARY OF THE INVENTION

Generally speaking, in accordance with the invention, a digital electronic watch is provided wherein a 1 Hz signal is produced by dividing the high frequency time standard signal of a standard oscillator by means of divider circuitry. Said 1 Hz signal is then applied to series-connected counters which produce 10-second, 1-minute, 10-minute, 1-hour, 12-hour (morning and afternoon), day and week signals, which signals are in turn applied to decoder and driving circuitry for driving liquid crystal displays.

The second display system includes six liquid crystal display elements, one of which is turned on and off each second, the other five of which are sequentially turned on every 10-seconds, the cycle being repeated every minute. The 1-minute, 10-minute and 1-hour digits of the minute and hour displays each are represented by seven liquid crystal elements arranged in a seven bar display for full digital display.

The day and date representations of a calendar are provided by a plurality of liquid crystal display elements arranged in matrix form having seven columns each representing the day of the week and five rows each representing the weeks of the month. Means is provided for receiving a plate having the days and dates of the month to be displayed arranged thereon in overlapping relation with said liquid crystal matrix.

Accordingly, an object of the invention is to provide a small-sized electronic digital watch requiring only small amounts of power, and wherein second, minute, hour, morning and afternoon, date and day of the week indications are displayed in digital form on a display panel formed from liquid crystal display elements.

Another object of the invention is to provide an electronic digital watch where switches are provided for regulating or setting the second, minute, hour, day and date.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
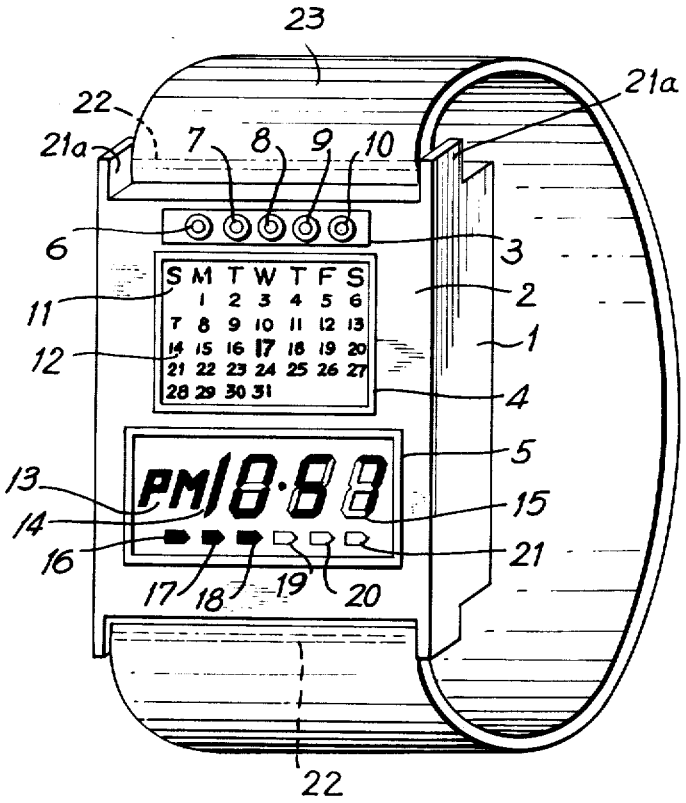
FIG. 1 is a perspective view of the exterior of a digital electronic watch in accordance with the invention.

Referring now to FIG. 1, the digital electronic watch 1 depicted therein is provided with a display panel 2 having a switching section 3, a calendar display section 4 and a time display section. Calendar display section 4 includes a day-of-week display section 11 and a date display section 12. The date display section includes a plurality of calendar plates having days and dates arranged in accordance with the months to be displayed, said calendar plates being manually sequentially mounted, in the proper order, on the surface of panel 2 as the appropriate month is reached.

Time display section 5 includes a morning-and-afternoon display section 13, wherein the morning (A.M.) period is indicated by no indication, and the afternoon (P.M.) period is indicated by a visual indication of "PM;" a two digit hour display section 14; a two digit minute display section 15; and a second display section consisting of elements 16, 17, 18, 19, 20 and 21. Second display element 16 is switched every second, element 17 being switched on after ten seconds, and elements 18, 19, 20 and 21 being successively switched on after successive ten second periods.

Second display elements 16 – 20, as well as morning-and-afternoon display sections 13, hour display section 14 and minute display section 15 are all formed from nematic liquid crystal material adapted to become turbid upon the application of an electric voltage, a state being hereinafter referred to as the "switching" or "turned on" state. When in this state, the liquid crystal material is visible, to provide a visible indication of the material to be displayed.

Upon the elapse of 60 seconds, the second display elements 17, 18, 19, 20 and 21 are all turned off, one minute being added to the minute display section 15. After 60 minutes elapse, the minute display section 15 is cleared and 1 hour is added to the hour display section. After 12 hours elapse, the hour and minute displays are cleared and the morning-and-afternoon display switches from no indication to a "PM" indication or from a "PM" indication to no indication. Further, the elapse of one day causes the date displayed at the calendar display section 12 to be cleared and the next date displayed thereon.

The embodiment of the digital electronic watch depicted in FIG. 1 is disposed to display the time of 10 hours, 57 minutes and 30 seconds of the afternoon of the 17th day (Wednesday) of the month indicated, assuming that the solidly shaded portions of the display elements are turned on and that second display element 16 has switched seven times. Since each display section or element is formed from liquid crystal material, the watch may operate at low power consumption levels and may be formed so as to be thin.

Switching section 3 includes a switch 7 for setting the minute indication, a switch 8 for setting the hour indication, a switch 9 for setting the data indication, and a switch 10 for regulating the calendar. In order to support the watch, a watch band 23 is secured to the watch case through push pins 22 mounted on projections 21 and 21a.

Figure 2:
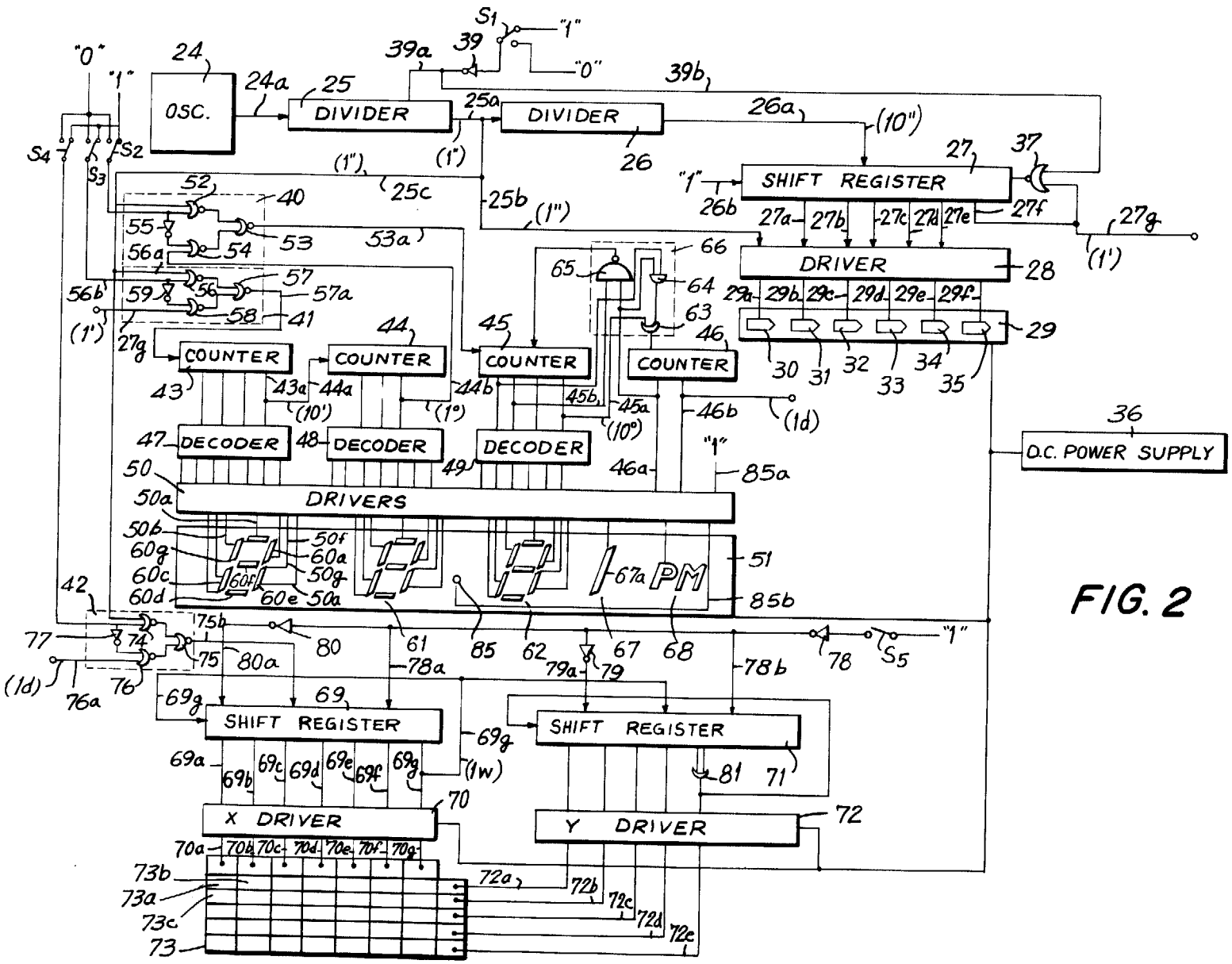
FIG. 2 is a block diagram of the electronic circuits employed in the digital electronic watch of FIG. 1.

An electric circuit employed in the digital watch of FIG. 1 is depicted in FIG. 2. Said circuit consists of a high frequency time standard oscillator 24 which produces a high frequency time standard signal of a frequency of 16,384 Hz which is applied through line 24a to divider 25, which divides the signal into a 1-second signal (1'') (a signal having a frequency of 1 pulse per second). The thus produced 1-second signal is supplied to divider 26 along line 25a, to driver 28 along line 25b and to logic circuits 40, 41 and 42 along line 25c. The 1-second signal applied to divider 26 is divided thereby to produce on line 26a a 10-second signal (10'') (a signal having shift register 27) through line 26a. Said shift register is of the 6-bit type so that a signal appears on line 27a thereof after the first 10-seconds has elapsed (at which time the first 10-second signal is received from divider 26), and then appears on successive lines 27b, 27c, 27d, 27e, and 27f, at successive 10-second intervals in response to the shift pulse applied to line 26a from divider 26. A predetermined voltage "1" is always applied to said shift register from line 26b.

Line 25b from the output terminal of divider 25 and lines 27a, 27b, 27c, 27d and 27e, respectively connected to the output terminals of shift register 27, are connected to second display driver 28. The signal transmitted from each line is amplified by driver 28 to produce a voltage on each line 29a, 29b, 29c, 29d, 29e and 29f corresponding respectively to line 25b, 27a, 27b, 27c, 27d and 27e. Lines 29a, 29b, 29c, 29d, 29e and 29f are, respectively, connected to the corresponding second display elements 30, 31, 32, 33, 34 and 35 of the liquid crystal display panel 29. Each element 30–35 of panel 29 comprises two glass plates between which is inserted a nematic liquid crystal material in the manner of a sandwich. Suitable electrodes are deposited on the surface of each of the plates in contact with said nematic liquid crystal material, at least one of said electrodes being shaped in the desired display configuration as depicted in the drawing. Upon the application of a voltage above the threshold voltage by means of a direct current power supply 36, each liquid crystal element changes in reflectivity so as to be visible.

In operation, second display element 30 is switched once each second to display the digits 0 through 9 since a 1-second signal is applied thereto through line 29a. After the elapse of ten seconds, a 10-second signal is produced from divider 26, and is applied to shift register 27 through line 26a, which signal, after amplification by driver 28, causes the element 31 to turn on to provide a 10-second display. Subsequently, the second display elements 32, 33, 34 and 35 are turned on successively at 10 second intervals in the same manner as element 31. The inputs of the elements other than element 30 are actuated from the outputs of shift register 27, so that each element remains on until all of the elements are turned off. Thus, at the time of 55 seconds, for example, elements 31, 32, 33, 34 and 35 are on, while element 30 has switched six times.

After the elapse of 60 seconds, a 1-minute signal (1') (a signal having one pulse per minute) appears on line 27f of shift register 27. Line 27f is connected to a NOR-circuit 37 so as to reset said shift register, thereby clearing all the output signals of the terminals 27a, 27b, 27c, 27d, 27e and 27f, to switch off the second display elements 31, 32, 33, 34 and 35. The 1-minute signal is also applied from line 27f through line 27g to logic circuit 41 for counting the minute signal.

In order to preset the second display mechanism, a second regulating switch $S_1$ (corresponding to the switch 6 shown in FIG. 1) is provided, which, when pressed, causes the "0" signal to be applied to a NOT circuit 39. The "1" signal produced by NOT circuit 39 when switch $S_1$ is pressed, is applied through lines 39a and 39b to divider 25 and NOR circuit 37, respectively. This signal momentarily prevents the dividing function in divider 25 and causes the watch to stop with the second display elements reset and at the same time with the second display element 30 turned on.

It is noted that the 1-second signal is transmitted through line 25c from divider 25 to the respective gate circuits of logic circuits 40, 41 and 42 which respectively control the display of the hour, minute, and morning-or-afternoon functions.

In addition to the above-described second display, time is displayed in a time display panel 15 formed of liquid crystal material, and an electronic circuit including logic circuits 40 and 41, counters 43, 44, 45 and 46, decoders 47, 48 and 49 and driver 50. Logic circuit 40 includes three NOR circuits 52, 53 and 54 and a NOT circuit 55, while logic circuit 41 includes three NOR circuits 56, 57 and 58 and a NOT circuit 59. The minute setting switch $S_3$, corresponding to switch 7 of FIG. 1, is connected in a neutral state to a source producing a "1" signal having a predetermined voltage so that NOR circuit 56 receives setting pulses transmitted from divider 25 through line 56a and said signal of predetermined voltage transmitted through line 56b. NOR circuit 58, on the other hand, receives the 1-minute signal transmitted from line 27g and a signal of zero voltage produced by NOT circuit 59 through the inversion of the signal from line 56b. The application of the 1-minute signal to NOR circuit 58 in the neutral state where the minute switch $S_3$ is not pressed, causes the output signal from the output terminal of NOR circuit 57 to be applied to decimal counter 43 through line 57a, which in turn applies a signal to decoder 47, which in turn applies a signal to drivers 50. Time during the interval between zero minutes and 9 minutes is displayed at the 1 and 10 minute display sections 60 and 61 formed in liquid crystal panel 51. 1-minute section 60 serves to display the first digit of the minute indication and consists of seven liquid crystal segments 60a, 60b, 60c, 60d, 60e, 60f and 60g, which in turn are connected by drivers 50 to corresponding lines 50a, 50b, 50c, 50d, 50e, 50f and 50g. When counter 43 receives the first 1-minute signal, an output is produced which is decoded by decoder 47 to actuate drivers 50 so that segment 60b and 60c are turned on to display 1 minute.

Thus, for example, when counter 43 counts 8 1-minute signals from line 57a, a voltage is applied to all of lines 50a, 50b . . . , g by drivers 50 to turn on all of display segments 60a, b, . . . , g, so that the numeral "8" is displayed at the 1-minute digit. On the other hand, when counter 43 counts 10 1-minute signals from line 57a, a 10-minute signal (10') (having a frequency of one-tenth pulse per minute) appears on line 43a and is applied to counter 44, which is of the hexagonary type, through line 44a so that numeral "1" is displayed by the 10-minute display section 61. Counter 43 is automatically reset to zero at this tenth count.

When the 60th 1-minute signal is counted by decimal counter 43 and hexagonary counter 44, a 1-hour signal (1°) (having a frequency of 1 pulse per hour) appears on line 44b representative of the last count of counter 44 and is applied to NOR circuit 54. Counters 43 and 44 clear themselves at the end of their respective counts so that zero digits are displayed at sections 60 and 61 of liquid crystal panel 51.

Logic circuit 41 is connected in the same manner as logic circuit 40, so that the application of the 1-hour signal to NOR circuit 54 causes a signal to be applied to the input of decimal counter 45 through line 53a, the output of counter 45 being applied through decoder 49 and driver 50 to liquid crystal display elements 62 representative of the 1-hour digits of the time display. The 1-hour digit is also represented by a seven bar display so that any digit from 0 to 9 is displayed to indicate any time from 1 o'clock to 9 o'clock. When counter 45 counts 10 1-hour signals, an output is applied along line 45a representative of a 10-hour signal (10°) (having a frequency of one-tenth pulse per hour) to logic circuit 66. Logic circuit 66 consists of an OR circuit 63, AND circuit 64 and NAND circuit 65, the output of said output logic being taken at line 46a and applied by said line to a quarnary counter 46. The 10-hour signal produces an output at lines 46a of counter 46 which serves to drive the 10-hour digit indicator 67 consisting of a single liquid crystal display element 67a shaped as the numeral "1". When display element 67a is turned on, counter 45 is automatically reset so that 1-hour display element 62 indicate a zero setting. After a further 2 hours have elapsed, a 2-hour signal is produced along line 45b from counter 45 and applied to NAND circuit 65, the output of which is applied to counter 45 to reset said counter to zero, and to clear the 1-hour digit display section 62. Counter 46 counts one pulse signal to clear 10-hour display section 67, and then turns on the liquid crystal segment 68 representing "PM", constituting the afternoon display section corresponding to section 13 of FIG. 1. After a further 12-hour lapsed time, a day signal (1d) (having a frequency of 1 pulse per day) is produced at the output of counter 46 on line 46b, at which time display section 62, 67 and 68 are all cleared. Thus, a 24 abic counter is formed by decimal counter 45, quarnary counter 46 and logic circuit 66, a 1 pulse signal appearing on line 46b every day.

Between hour display section 67 and minute display section 61 there is provided a pointed mark 85 to separate the hour and minute display sections. This pointed mark is formed from liquid crystal material which is continually energized due to the constant application of a voltage thereto through lines 85a and 85b. It is noted that minute display sections 60 and 61 correspond to the minute display section 15 of FIG. 1 and that the hour display sections 62 and 67 correspond to the hour display section 14 of FIG. 1.

Switches $S_2$ and $S_3$ are provided for setting the minute and hour displays respectively. When switch $S_3$ is pressed, it is connected to the terminal to which "0" voltage is applied. A 1-second signal appears on 57a of the NOR circuit and is applied to decimal counter 43 irrespective of the signal on line 27g since a "0" voltage is applied on line 56b and a signal having a frequency of 1 pulse per second appears on line 25c. Thus, the setting of the switch $S_3$ to the "0" voltage terminal results in the counting by the 1-minute digit of the display at a rate of 1 pulse per second. On the other hand, when switch $S_3$ is connected to the "1" terminal, the digits are counted at a rate of 1 pulse per minute for display at section 60. In this manner, the minute setting may be reset. Similarly, when switch $S_2$ is connected to the "0" voltage terminal, the hour display counts digits at the rate of 1 pulse per second, thereby enabling the resetting of the hour. Time display panel 51 is operatively connected to DC power supply 36.

The calendar mechanism in accordance with the invention consists of a calendar display panel 73 and an electronic circuit including a 7-bit shift register 69, a driver 70, a 6-bit shift register 71 and a driver 72. Logic circuit 42 is connected in the same way as logic circuits 40 and 41 and consists of three NOR circuits 74, 75 and 66 and a NOT circuit 77. The 1-day signal produced on line 46b of counter 46 is applied to NOR circuit 76 through line 76a and appears on the output terminal of the NOR circuit 75. Said signal is then applied to shift register 69 through line 75b. The output terminals of the 7-bit shift register 69 are connected to a driver 70 through lines 69a, b, . . . g, while the output terminals of the driver 70 are connected through lines 70a, b, . . . g, to the abscissa 73 of the calendar display panel 73 represented respectively of the days of the week from Sunday to Saturday.

On the other hand, the ordinate of the panel 73 is connected along line 72a, 72b, 72c, 72d and 72e to driver 72, each of said lines being representative of one of the 5 weeks of a month. The input terminal to drive 72 is connected to the output terminal of 6-bit shift register 71 for shifting the signal upon reception of a 1 week signal (1w) (having a frequency of 1 pulse per week) received from line 69g and representing the last output of shift register 69. Thus, shift register 71 is shifted 1 step per week. Lines 72a, b, . . . , e and lines 70a, b, . . . g are connected in a rectangular matrix so that the crossed portion of the lines, to which the pulse voltages are applied, are actuated to display any one of the liquid crystal elements arranged on the calendar display panel 73. Panel 73 is constructed so that a plate on which days and dates arranged according to the month to be displayed is overlapped on the liquid crystal elements in a one-to-one relation to the day and date of the month. This panel 73 is changed by a suitable means so that the day and dates may be selected in accordance with the month to be displayed.

When switch $S_5$ is pressed in order to adjust the calendar, a "0" reset signal appears on lines 78a and 78b due to NOT circuit 78 in order to reset the 7-bit and 6-bit shift registers 69 and 71 respectively. A "1" signal appears on line 79a and 80a to produce a signal on line 70a and 72a connected to the first terminals of drivers 70 and 72 respectively, thus turning on the liquid crystal element 73a disposed on the cross portion of lines 70a and 72a. A further 1-day elapse causes the 1-day signal to appear on line 76b, and then on the output line 75b of NOR circuit 75 to operate shift register 69. At this point, the signal on line 70a is shifted to line 70b so that liquid crystal display element 73b st the intersecting point of lines 70b and 72a is actuated. The lapse of 1 week causes the 1-week signal to appear on line 69g, which signal is applied to both the 7-bit and 6-bit shift registers 69 and 71 and appears on line 69a of the first column of the abscissa and on the line 72b of the second row of the ordinate, thereby turning on element 73c. The fifth and final output terminal of 6-bit shift register 71 is connected to an OR circuit 81, so that the signal produced after the passing of 5 weeks is fed back to the input to produce a voltage on line 72a representing the first week. DC power supply 36 is connected to each of drivers 82 and 83 to operate same.

The pressing of switch $S_4$ in order to set the day causes a pulse having a frequency of 1 pulse per second to appear on line 75b of the logic circuit to operate the shift register to set the day.

While a non-digital display 29 of the second indication is incorporated in the embodiment of the watch in accordance with the invention, a seven segment liquid crystal element such as is used in connection with the hour and minute display may be incorporated to provide a display of the second. The digital electronic watch in accordance with the invention utilizes liquid crystal display mechanisms requiring only small amounts of electric power, so that a plurality of such liquid crystal display elements can be utilized to display the second, minute, hour, morning and afternoon and calendar indications. This enables a digital electronic watch to provide a plurality of time information despite its small size, as compared with conventional watches wherein light emission diode elements are used for the display of time.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A digital electronic watch comprising a time standard oscillator for producing a high frequency time standard signal; circuit means for dividing said high frequency time standard signal into at least minute and hour display driving signals; liquid crystal display means for displaying time in response to said minute and hour driving signals; further circuit means for producing signals having a frequency of 1 pulse per day and 1 pulse per week from said first-mentioned circuit means; calendar display means including a matrix of liquid crystal elements having at least seven columns and a plurality of rows and means for sequentially actuating selected ones of said liquid crystal elements located at the intersection of an actuated row and an actuated column by sequentially actuating said columns in response to said signal having a frequency of 1 pulse per day and for sequentially actuating said rows in response to said signal having a frequency of 1 pulse per week.

2. A digital electronic watch as recited in claim 1, including switching means for the manual resetting of said means for applying actuating signals to said rows and columns for resetting said calendar display means.

3. A digital electronic watch as recited in claim 1, wherein said liquid crystal element matrix includes at least five rows.

4. A digital electronic watch as recited in claim 1, including overlay means dimensioned for registration with said liquid crystal element matrix and having the date and days of the week of the month to be displayed depicted thereon, and means for manually securing said overlay in registration with said matrix.

5. A digital electronic watch as recited in claim 1, wherein said minute and hour display means provide digital display of said minute and hour.

6. A digital electronic watch as recited in claim 5, including second display means, said second display means including six liquid crystal display elements, said first-mentioned circuit means being adapted to produce a 1-second signal, one of said six liquid crystal elements being actuated once each second in response to said 1-second signal, the other of said six liquid crystal elements being sequentially actuated in response to said 1-second signal at 10-second intervals.

7. A digital electronic watch as recited in claim 1, said watch including first switching means for selectively resetting said minute and hour display means, and second switching means for selectively resetting said means for actuating said columns and rows for resetting the calendar display means.

*8. A digital electronic watch comprising a time standard oscillator for producing a high frequency time standard signal; circuit means for dividing said high frequency time standard signal into at least second, minute and hour display driving signals; digital display means for numerically displaying time in response to said minute and hour driving signals; and further display means for displaying seconds in response to said seconds driving signal, said seconds display means including a plurality of display elements, each said display element being representative of an increment of seconds and being sequentially actuated at least once at a predetermined interval of time, for each minute driving signal.*

*9. A digital electronic watch as claimed in claim 8, wherein said predetermined interval of time is equal to sixty seconds divided by said number of further display elements.*

*10. A digital electronic watch as claimed in claim 8, wherein said plurality of display elements equals six.*

*11. A digital electronic watch as claimed in claim 9, wherein said plurality of display elements equals six.*

*12. An electronic watch as claimed in claim 8, wherein said further display means includes six elements, one of said elements being actuated once each second in response to said seconds driving signal and the remaining elements being sequentially actuated at an interval of time equal to ten seconds.*

*13. A digital electronic watch as claimed in claim 8, wherein said further display means includes six display elements, one of said display elements being energized once each second, the other of said six display elements being sequentially energized at ten second intervals.*

*14. A digital electronic watch as claimed in claim 8, wherein said numerical digital display means and said further display means are liquid crystal display elements.*

*15. A digital electronic watch as claimed in claim 12, wherein said numerical digital display means and said further display means are liquid crystal display elements.*

*16. A digital electronic wristwatch as claimed in claim 9, having calendar display means including a matrix of display elements having at least seven columns and a plurality of rows, further circuit means coupled to said first-mentioned circuit means for producing signals having a frequency of one pulse per day and one pulse per week, and means for sequentially actuating selected ones of said display elements located at the intersection of an actuated row and actuated column by sequentially actuating said columns in response to said signal having a frequency of 1 pulse per day and for sequentially actuating said rows in response to said signal having a frequency of 1 pulse per week.*

*17. A digital electronic timepiece as claimed in claim 16, wherein said matrix of display elements, said numerical display elements and said further display elements are liquid crystal elements.*

*18. A calendar display device comprising a time standard oscillator for producing a time standard frequency signal; circuit means for dividing said time standard frequency signal into lower frequency signals, and further circuit means in response to said lower frequency signals produced by said first-mentioned circuit means producing signals having a frequency of at least one pulse per day and one pulse per week, and a matrix of display elements having at least seven columns and a plurality of rows and means for sequentially actuating selected ones of said display elements located at the intersection of an actuated row and actuated column by sequentially actuating said columns in response to said signal having a frequency of one pulse per day and for sequentially actuating said rows in response to said signal having a frequency of one pulse per week.*

*19. A calendar display device as claimed in claim 18, wherein said matrix display elements are liquid crystals.*

* * * * *